(12) United States Patent
Guy (10) Patent No.: US 8,587,599 B1
(45) Date of Patent: Nov. 19, 2013

(54) ASSET SERVER FOR SHARED HARDWARE GRAPHIC DATA

(71) Applicant: Google Inc., Mountain View, CA (US)

(72) Inventor: Romain Guy, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/663,053

(22) Filed: Oct. 29, 2012

(51) Int. Cl.
*G06F 15/167* (2006.01)

(52) U.S. Cl.
USPC ........... 345/541; 345/522; 345/535; 345/552; 345/582; 710/240; 711/147; 718/105

(58) Field of Classification Search
None
See application file for complete search history.

(56) References Cited

U.S. PATENT DOCUMENTS

| | | | |
|---|---|---|---|
| 6,947,051 B2 | 9/2005 | Gossalia et al. | |
| 7,868,893 B2 * | 1/2011 | Feth et al. | 345/522 |
| 8,161,252 B1 | 4/2012 | Case et al. | |
| 8,203,568 B2 | 6/2012 | Clemie et al. | |
| 8,216,052 B2 * | 7/2012 | Gagner et al. | 463/20 |
| 8,533,733 B2 * | 9/2013 | Bhogal et al. | 718/105 |
| 2011/0242117 A1 | 10/2011 | Bolz | |

* cited by examiner

*Primary Examiner* — Antonio A Caschera
(74) *Attorney, Agent, or Firm* — McDonnell Boehnen Hulbert & Berghoff LLP (57) ABSTRACT

In a communication device with a graphics processor, a graphics asset can be shared with two or more applications. The graphics asset can include a bitmap of a digital image. An asset server can host a texture corresponding to the graphics asset and can share the texture with the graphics processor. The asset server can host multiple textures and can share those textures with the graphics processor for rendering. The graphics processor can use the shared texture to render an instance of the graphics asset for each of the two or more applications. The texture can be generated by copying information about the graphics asset into the asset server.

16 Claims, 7 Drawing Sheets

ASSET SERVER FOR SHARED HARDWARE GRAPHIC DATA

BACKGROUND

In a communication device, an application can benefit from hardware acceleration such as the use of a graphics processor. Typically, an asset (e.g., image bitmap) used by the application is copied as a texture into the memory of the graphics processor. Because of the way in which Open Graphics Library (OpenGL) and graphics processors work, each application needs to have its own texture copy of an asset. When multiple applications use the same asset then multiple textures are copied into memory even though all of the copied textures correspond to the same asset. To make better use of memory resources in the graphics processor, a different approach may be needed when handling the same asset for multiple applications.

Further limitations and disadvantages of conventional and traditional approaches will become apparent to one of skill in the art, through comparison of such systems with some aspects of the present disclosure as set forth in the remainder of the present application with reference to the drawings.

SUMMARY OF THE DISCLOSURE

A method is provided in which, in a communication device that includes a graphics processor, a graphics asset can be shared with two or more applications. A texture corresponding to the graphics asset can be shared with the graphics processor. The graphics processor can render an instance of the graphics asset for each of the applications based on the shared texture.

A communication device is provided that includes one or more graphics processors (GPUs), one or more processors communicatively coupled to the one or more GPUs, and a memory communicatively coupled to the one or more GPUs and to the one or more processors. The memory can contain executable instructions that cause the processor to share a graphics asset with two or more applications and to share a texture corresponding to the graphics asset with the one or more GPUs. The memory can also contain executable instructions that cause the one or more GPUs to render, based on the shared texture, an instance of the graphics asset for each of the applications.

Another method is provided in which, in a communication device that includes one or more GPUs and one or more processors, a first process and a second process are executed on the one or more processors. From the first process, a graphics asset can be shared with two or more applications. From the second process, a texture corresponding to the graphics asset can be shared with the one or more GPUs. From the two or more applications, the graphics asset can be shared with the one or more GPUs. The one or more GPUs can render an instance of the graphics asset for each of the applications based on the shared texture and the shared graphics asset.

These and other advantages, aspects and novel features of the present disclosure, as well as details of illustrated implementations thereof, will be more fully understood from the following description and drawings.

DETAILED DESCRIPTION

Certain implementations described in the disclosure relate to a method and system for an asset server for shared hardware graphic data. Several aspects include sharing a graphics asset with two or more applications in a communication device having a graphics processor. The graphics asset can include a bitmap of a digital image and can be shared from a process that can execute from the operating system. An asset server can host a texture corresponding to the graphics asset and can share the texture with the graphics processor. The asset server can host multiple textures and can share those textures with the graphics processor for rendering. The graphics processor can use the shared texture to render an instance of the graphics asset for each of the two or more applications. The texture can be generated by copying information about the graphics asset into the asset server. Once the various instances of the graphics asset are rendered, they can be displayed on a screen of the communication device.

Figure 1:
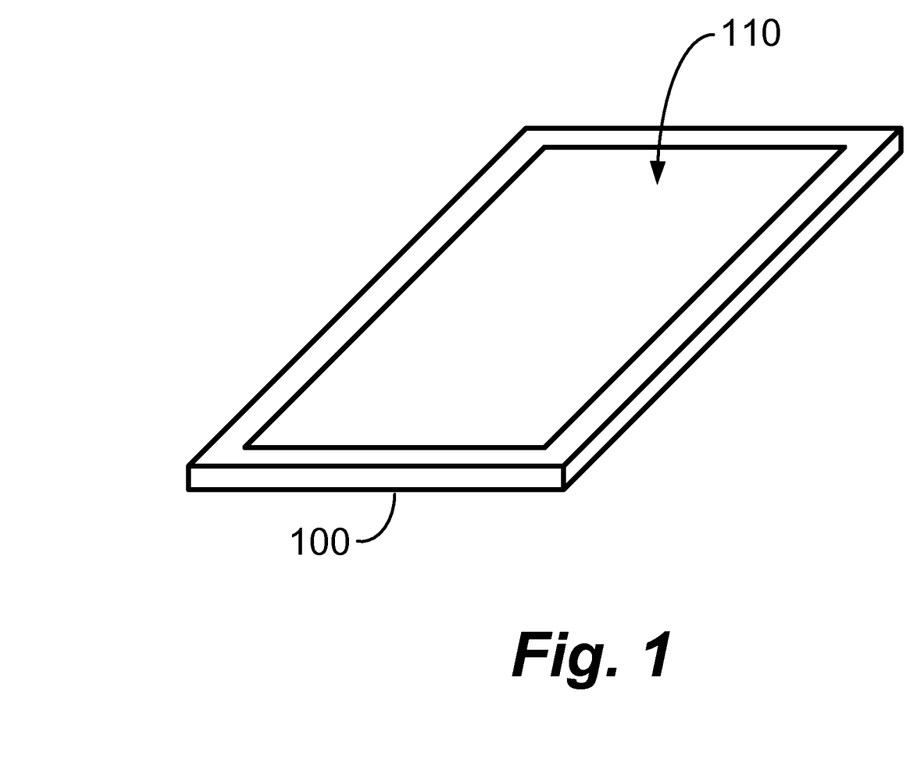
FIG. 1 is a diagram that illustrates a communication device that is operable to support an asset server for shared hardware graphic data.

FIG. 1 is a diagram that illustrates a communication device that is operable to support an asset server for shared hardware graphic data. Referring to FIG. 1, there is shown a communication device 100 having a user interface 110. The user interface 110 can include a display screen, a touch screen, a keyboard, or a combination thereof. A user can interact with the communication device 100 through the user interface 110. The user can be presented with graphics and/or images displayed on the user interface 110 to enable those interactions. For example, the user can be presented with icons, images, buttons, and/or the like that allow the user to make selections and/or input information in connection with one or more applications. In some implementations, the user interface 110 can include a speaker and a microphone to enable audio-based user interactions.

The communication device 100 can be a mobile device, a tablet, a computer, and/or any other type of device that enables a user to interact with applications running on the device. Although not shown in FIG. 1, the communication device 100 can be operable to communicate with other devices through one or more communication protocols (e.g., wireless protocols) and through one or more networks.

The communication device 100 can be operable to support the use of one or more processes to handle the sharing of assets, such as graphics assets for example, to reduce or minimize the need for memory resources. In some implementations, these processes can be part of an operating system running on the communication device 100. These processes can include an asset server to handle the sharing of information corresponding to a graphics asset when the applications use some form of hardware acceleration such as rendering by a graphics processor, for example.

Figure 2:
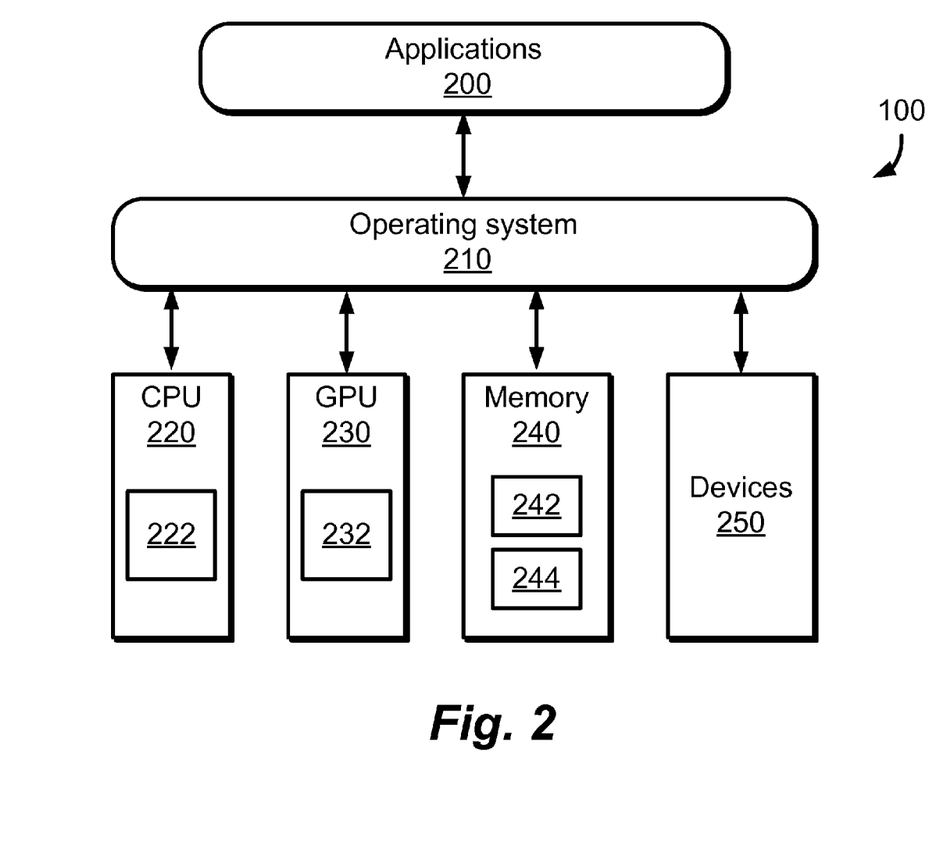
FIG. 2 is a block diagram that illustrates an example of an architecture for a communication device that is operable to support an asset server for shared hardware graphic data.

FIG. 2 is a block diagram that illustrates an example of an architecture for a communication device that is operable to support an asset server for shared hardware graphic data. Referring to FIG. 2, there is shown an implementation of the communication device 100 described above with respect to FIG. 1. The communication device 100 can include several hardware components such as one or more central processing unit (CPU) 220, one or more graphics processor or graphics processing unit (GPU) 230, a memory 240, and devices 250. One or more software components such as an operating system 210 and one or more applications 200 can be running on the communication device 100.

The CPU 220 can include one or more integrated circuits that are operable to carry out the instructions of a program or application by performing arithmetical, logical, and input/output operations. The CPU 220 can include an internal memory 222 in which the instructions and/or data that are used by the CPU 220 can be copied or stored.

The GPU 230 can include one or more integrated circuits that are operable to manipulate and process data to accelerate the building of images or display frames intended for output to a display or screen in the communication device 100. The GPU 230 can perform rendering operations in connection with the hardware acceleration of images or display frames. The GPU 230 can include an internal memory 232 in which the instructions and/or data that are used by the GPU 230 can be copied or stored. For example, the memory 232 can store one or more textures corresponding to assets (e.g., graphics assets).

The memory 240 can include one or more integrated circuits that are operable to store and/or retrieve data that can be utilized in the operations performed by the CPU 220, the GPU 230, and/or the devices 250. The memory 240 can be connected to other hardware components through one or more memory buses.

The memory 240 can include multiple portions. In the implementation shown in FIG. 2, the memory 240 can, for example, include a first memory or first memory portion 242 and a second memory or second memory portion 244. In this example, the first memory 242 can be used to store data and/or instructions for one device (e.g., the CPU 220) while the second memory 244 can be used to store data and/or instructions for another device (e.g., the GPU 230). The example shown in FIG. 2 is provided by way of illustration and not of limitation. The memory 240 can include more or fewer portions or partitions from those shown in this example. Moreover, data and/or instructions for any one device can be distributed across more than one portion or partition of the memory 240.

The devices 250 can include different types of input devices, output devices, and/or input/output (I/O) devices. For example, the devices 250 can include a screen or display to reproduce images and/or display frames, a keyboard to type information, a speaker for audio reproduction, and/or a microphone for capturing audio. When the screen is a touch screen, for example, it can also be used to receive input from a user by touching a portion of the screen with a finger or with a stylus. One or more of the devices 250 can be used as part of the user interface 100 described above with respect to FIG. 1.

The operating system 210 can include software that is used to manage the various hardware resources of the communication device 100. The operating system 210 can also be used to provide common services to computer programs or applications. The operating system 210 tends to act as an intermediary between the hardware components and the applications 200. In some implementations, processes in the operating system 210 can be used to handle assets and/or textures in connection with hardware acceleration operations that involve the GPU 230, for example.

The applications 200 can include one or more software applications (i.e., computer programs) that help the user perform a specific task. For example, a software application can include an interactive application that displays content to a user and allows the user to provide input as to the manner in which the content is provided and/or the type of content that is provided. To perform a task (e.g., web browsing, video playback, etc.), the applications 200 can access the CPU 220, the GPU 230, the memory 240, and/or the devices 250 through the operating system 210.

The applications 200 can use assets (e.g., graphics assets) that represent images, icons, and/or other graphics that are displayed in the communication device 100. The applications 200 can work together with the operating system 210 and the GPU 230 to provide hardware acceleration for handling these assets.

Figure 3:
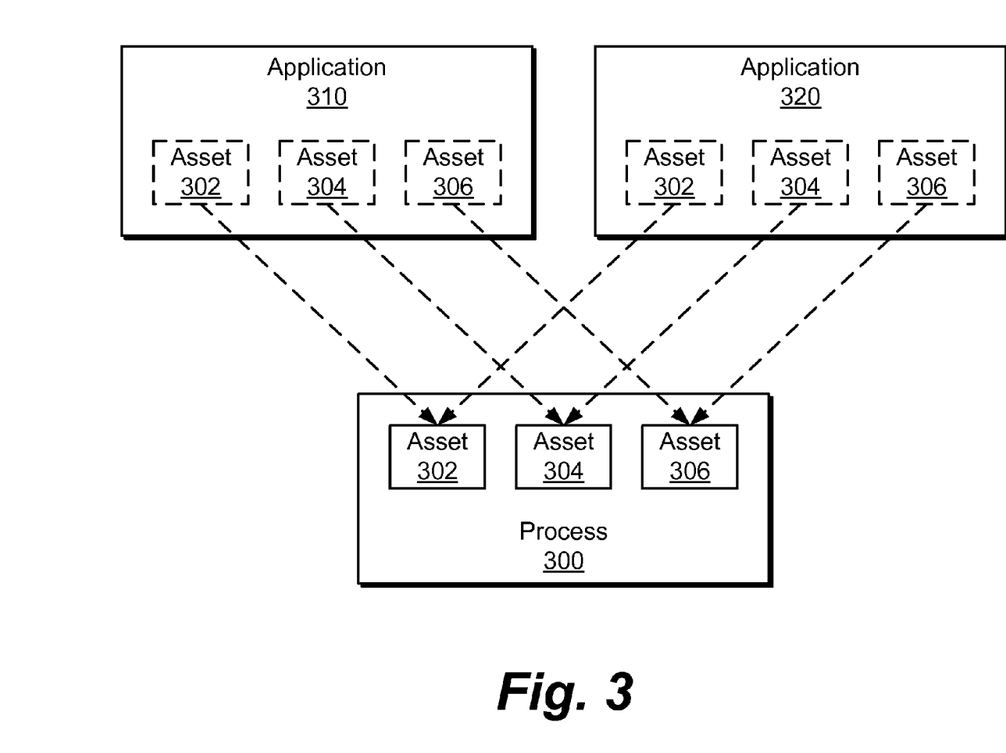
FIG. 3 is a block diagram that illustrates an example of a process sharing graphics assets with multiple applications.

FIG. 3 is a block diagram that illustrates an example of a process sharing graphics assets with multiple applications. Referring to FIG. 3, there is shown a process 300 that can share assets 302, 304, and 306 with applications 310 and 320. The process 300 can typically run or execute on an operating system such as the operating system 210 described above. The process 300 can be started up when the operating system is initialized. In other implementations, the process 300 can run or execute separately from the operating system as part of a system application or a low level system program. In these implementations, the process 300 can be started up when the application or program is initialized.

Each of the assets 302, 304, and 306 can represent a different asset. For example, when the assets 302, 304, and 306 correspond to graphics assets they can each represent a different image or icon. One asset may represent an image of a button, another asset may represent an image of a logo, and the other asset may represent an image of text. Each of the assets can include bitmap information that allows the image or icon to be reproduced for display.

The process 300 can enable the reduction of memory footprint and redundancy by allowing a single copy of a system asset to be shared among multiple applications. For example, a single copy of asset 302 can be shared with applications 310 and 320. Similarly, a single copy of asset 304 and a single copy of asset 306 can be shared with applications 310 and 320.

The example shown in FIG. 3 is provided by way of illustration and not of limitation. In some implementations, more or fewer assets than those shown in FIG. 3 can be share with two or more applications.

Figure 4:
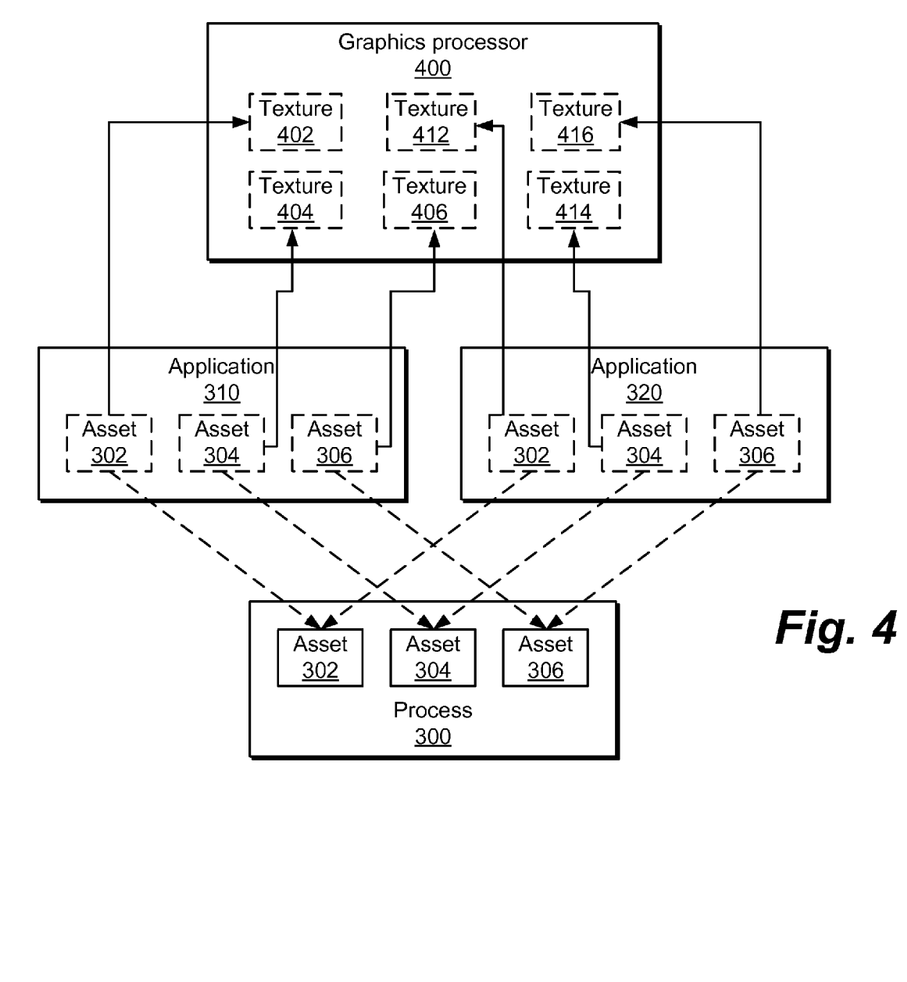
FIG. 4 is a block diagram that illustrates an example of multiple applications producing textures in a graphics processor.

FIG. 4 is a block diagram that illustrates an example of multiple applications producing textures in a graphics processor. Referring to FIG. 4, there is shown the process 300 as well as the applications 310 and 320 of FIG. 3. Also shown is a graphics processor 400 that can correspond to the GPU 230 described above with respect to FIG. 2, for example. The graphics processor 400 can have stored a texture for each of the assets that are shared with the applications 310. For example, the assets 302, 304, and 306 in the application 310 can have corresponding textures 402, 404, and 406 in the graphics processor 400. Similarly, the assets 302, 304, and 306 in the application 320 can have corresponding textures 412, 414, and 416 in the graphics processor 400.

Thus, while only three (3) different assets are being used in this example, six (6) different textures are stored in the graphics processor 400. The reduction of memory footprint and redundancy provided by the process 300 can be at least partially offset by having each application produce a separate texture for each of the assets that are shared with that application. To address this issue, an asset server or other similar process can be used as described below.

Figure 5:
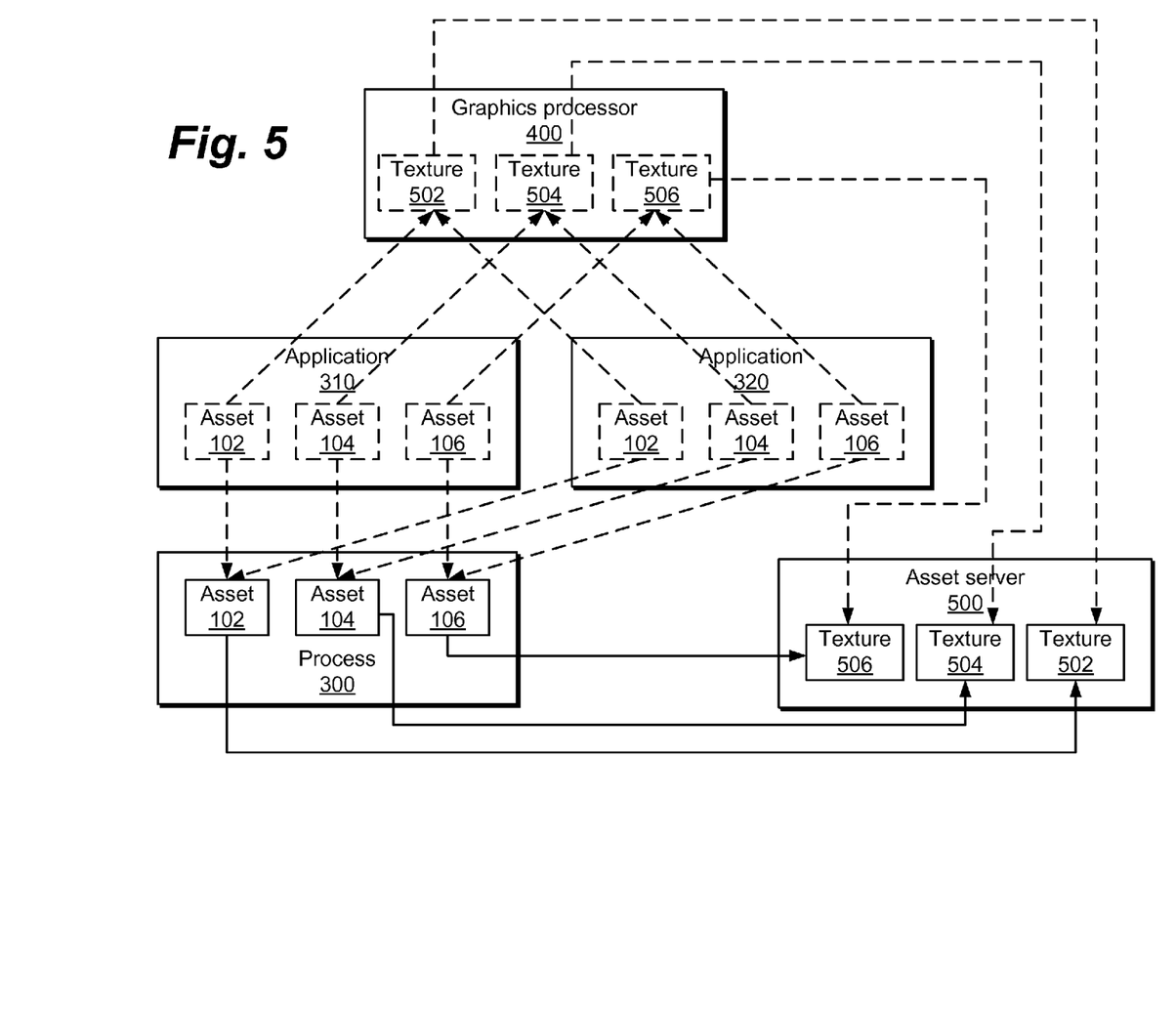
FIG. 5 is a block diagram that illustrates an example of an asset server that is operable to reduce the number of textures needed by the graphics processor.

FIG. 5 is a block diagram that illustrates an example of an asset server that is operable to reduce the number of textures needed by the graphics processor. Referring to FIG. 5, there is shown the process 300 as well as the applications 310 and 320 of FIG. 3. Also shown is the graphics processor 400 described above with respect to FIG. 4. In addition, there is shown an asset server 500.

The asset server 500 can be a process that runs or executes on an operating system such as the operating system 210. The asset server 500 can be started up when the operating system is initialized, for example. In other implementations, the asset server 500 can run or execute separate from the operating system as part of a system application or a low level system program. In these implementations, the asset server 500 can be started up when the application or program is initialized, for example. Although the asset server 500 is shown as separate from the process 300, in some implementations the features or functions of the asset server 500 and of the process 300 can be provided by a single process.

A texture for each of the assets in the process 300 can be produced in the asset server 500. For example, a texture 502 can be produced by copying information from the asset 102, a texture 504 can be produced by copying information from the asset 104, and a texture 506 can be produced by copying information from the asset 106. Once the textures 502, 504, and 506 are created, they can be shared with the graphics processor 400. In the example illustrated in FIG. 5, only three (3) textures are needed in the memory of the graphics processor 400 for the three (3) different assets being used. That is half the number of textures as were needed in the example shown in FIG. 4. Accordingly, by using an asset server such as the asset server 500, the reduction of memory footprint and redundancy provided by the process 300 can be maintained.

The example shown in FIG. 5 is provided by way of illustration and not of limitation. In some implementations, more or fewer textures than those shown in FIG. 5 can be produced in the asset server 500 and shared with the graphics processor 400. Moreover, there may be implementations in which more than one asset server is used and where the different asset servers are configured to handle different types of assets.

Figure 6:
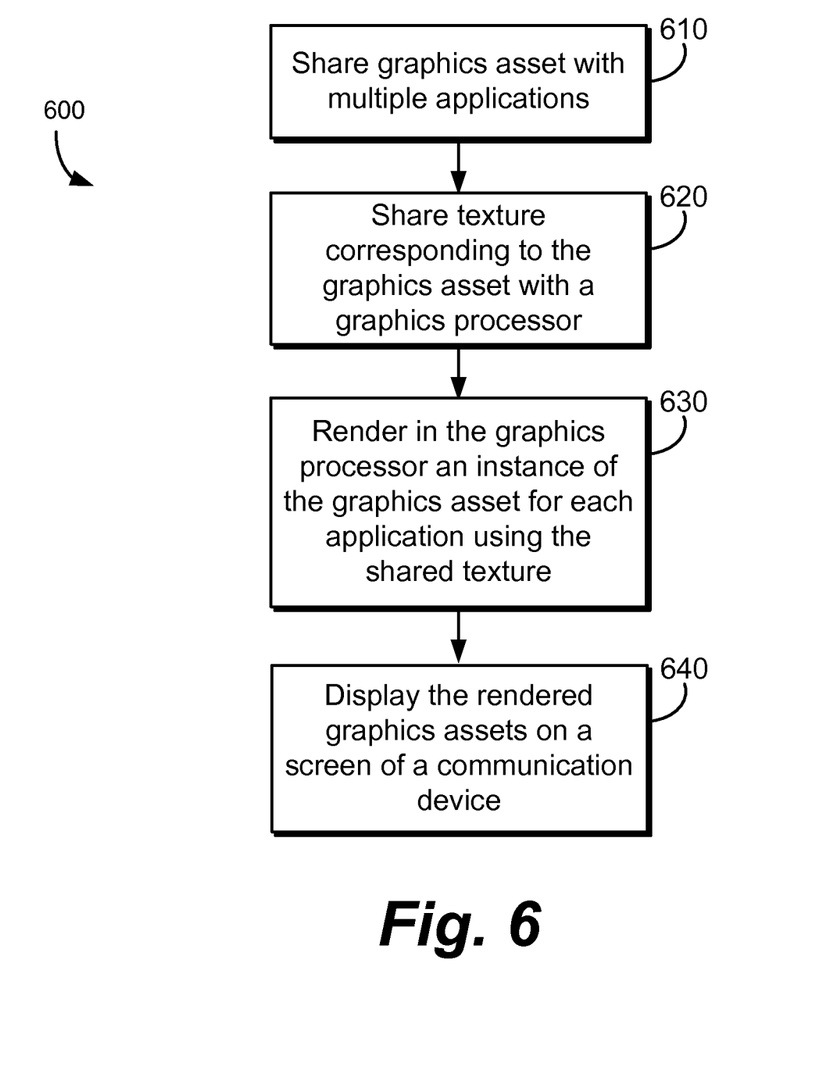
FIG. 6 is a flow diagram that illustrates examples of steps for using an asset server for shared hardware graphic data.

FIG. 6 is a flow diagram that illustrates examples of steps for using an asset server for shared hardware graphic data. Referring to FIG. 6, there is shown a flow chart 600 in which, at step 610, a graphics asset (e.g., an image bitmap) can be shared with multiple applications (e.g., two or more of the applications 200). At step 620, a texture corresponding to the graphics asset can be shared with a graphics processor (e.g., the GPU 230).

At step 630, the graphics processor can render an instance of the graphics asset for each of the applications by using the shared texture. For example, the graphics processor can render an image of a button that can be used by multiple applications concurrently. At step 640, the graphics asset that is rendered can be displayed on a screen (e.g., the user interface 110) of a communication device.

In some implementations related to the process described in FIG. 6, the communication device can include a processor (e.g., CPU 220) and the graphics asset can be shared with the two or more applications by a first process executing on the processor. The first process can be started up when the communication device is initialized or when an operating system (e.g., the operating system 210) that executes on the processor is initialized. Information corresponding to the graphics asset can be copied into a second process executing on the processor to produce the texture. The second process can be different from the first process. From the second process, the texture can be shared with the graphics processor.

The process described in FIG. 6 can also include sharing an additional graphics asset with the two or more applications, sharing a texture corresponding to the additional graphics asset with the graphics processor, and rendering using the graphics processor, an instance of the additional graphics asset for each of the two or more applications. The rendering can be based on the shared texture corresponding to the additional graphics asset.

When the communication device includes a processor, the process described in FIG. 6 can include sharing from a process executing on the processor, the graphics asset with the two or more applications and the texture corresponding to the graphics asset with the graphics processor. Moreover, when the communication device includes a processor, the process described in FIG. 6 can include hosting the texture in an asset server (e.g., the asset server 510) executing on the processor and sharing from the asset server, the texture with the graphics processor.

Figure 7:
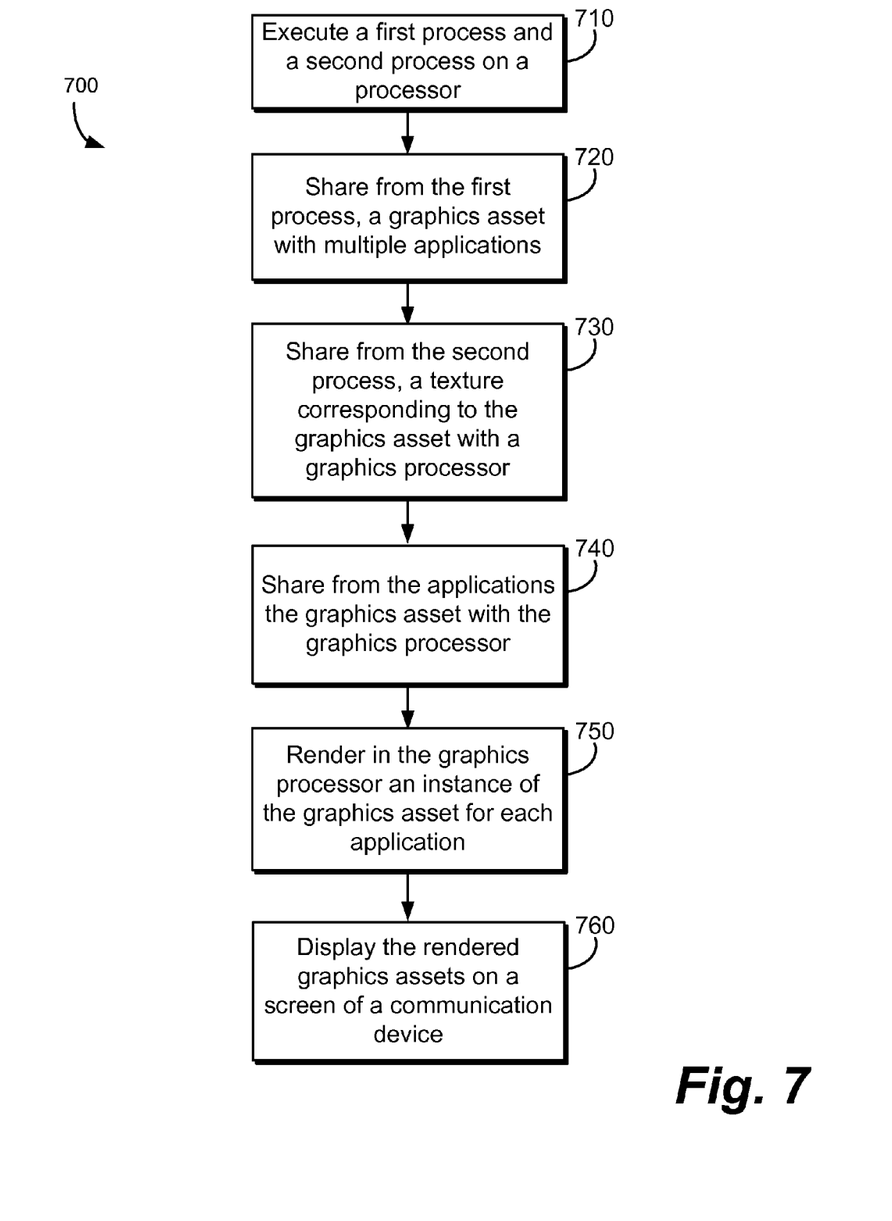
FIG. 7 is a flow diagram that illustrates examples of steps for using various processes for shared hardware graphic data.

FIG. 7 is a flow diagram that illustrates examples of steps for using various processes for shared hardware graphic data. Referring to FIG. 7, there is shown a flow chart 700 in which, at step 710, a first process (e.g., the process 300) and a second process (e.g., the asset server 500) can execute on a processor (e.g., the CPU 220). In some implementations, the first process can include the second process or the second process can include the first process. At step 720, a graphics asset can be shared with multiple applications from the first process. At step 730, a texture that corresponds to the graphics asset can be shared with the graphics processor from the second process.

At step 740, the graphics asset can be shared with the graphics processor from the applications. At step 750, the graphics processor can render an instance of the graphics asset for each of the applications. For example, the graphics processor can render an image of a button that can be used by multiple applications concurrently. At step 760, the graphics asset that is rendered can be displayed on a screen (e.g., the user interface 110) of a communication device.

Some implementations provide for a communication device (e.g., the communication device 100) to include a graphics processor (e.g., the GPU 230), a processor (e.g., the CPU 220) communicatively coupled to the graphics processor, and a memory (e.g., the memory 240) communicatively coupled to the graphics processor and to the processor. The memory can contain executable instructions that cause the processor to share a graphics asset with two or more applications and to share a texture corresponding to the graphics asset with the graphics processor. The executable instructions used by the processor can be copied, at least temporarily, to an internal memory (e.g., the memory 222) of the processor.

The memory can also contain executable instructions that cause the graphics processor to render based on the shared texture, an instance of the graphics asset for each of the two or more applications. The executable instructions used by the graphics processor can be copied, at least temporarily, to an internal memory (e.g., the memory 232) of the graphics processor.

The memory can have a first memory (e.g., the first memory portion 242) and a second memory (e.g., the second memory portion 244), where the first memory can store or contain the executable instructions that are used with the processor and the second memory can store or contain the executable instructions that are used with the graphics processor.

Another implementation provides for a non-transitory machine and/or computer readable storage and/or media, having stored thereon, a machine code and/or a computer program having at least one code section executable by a machine and/or a computer, thereby causing the machine and/or computer to perform the steps as described herein for an asset server for shared hardware graphic data.

Accordingly, the present disclosure can be realized in hardware, software, or a combination of hardware and software. The present disclosure can be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure can also be embedded in a computer program product, which includes all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to a particular implementation disclosed, but that the present disclosure will include all implementations falling within the scope of the appended claims.

What is claimed is:

1. A method, comprising:
   in a communication device including a graphics processor, a processor, and a process executable by the processor to maintain a plurality of graphics assets,
   sharing from the process, at least one graphics asset from the plurality of graphics assets with two or more applications, the two or more applications being different from the process;
   hosting a texture corresponding to the at least one graphics asset in an asset server executing on the processor;
   sharing, by the asset server, the texture with the graphics processor; and
   rendering using the graphics processor, an instance of the at least one graphics asset for each of the two or more applications, the rendering being based on the shared texture.

2. The method of claim 1, comprising:
   copying information corresponding to the at least one graphics asset into the asset server to produce the texture.

3. The method of claim 1, comprising starting up the process when the communication device is initialized.

4. The method of claim 1, comprising starting up the process when an operating system that executes on the processor is initialized.

5. The method of claim 1, wherein the at least one graphics asset includes a bitmap of a digital image.

6. The method of claim 1, wherein the graphics processor is a graphics processing unit.

7. The method of claim 1, comprising:
   sharing an additional graphics asset from the plurality of graphics assets with the two or more applications;
   sharing a texture corresponding to the additional graphics asset with the graphics processor; and
   rendering using the graphics processor, an instance of the additional graphics asset for each of the two or more applications, the rendering being based on the shared texture corresponding to the additional graphics asset.

8. A communication device, comprising:
   one or more graphics processing units (GPUs);
   one or more processors communicatively coupled to the one or more GPUs; and
   a memory communicatively coupled to the one or more GPUs and to the one or more processors,
      wherein the one or more processors is configured to execute a process to maintain a plurality of graphics assets,
      wherein the memory contains executable instructions that, when executed by the one or more processors, cause the one or more processors to:
         share at least one graphics asset from the plurality of graphics assets with two or more applications, the two or more applications being different from the process,
         host a texture corresponding to the at least one graphics asset in an asset server, and
         share, from the asset server, the texture with the one or more GPUs, and
      wherein the memory contains executable instructions that, when executed by the one or more GPUs, cause the one or more GPUs to render based on the shared texture, an instance of the at least one graphics asset for each of the two or more applications.

9. The communication device of claim 8, wherein the memory comprises a first memory and a second memory, the first memory containing the executable instructions for the one or more processors and the second memory containing the executable instructions for the one or more GPUs.

10. The communication device of claim 8, wherein the executable instructions, when executed by the one or more processors, cause the one or more processors to
   copy information corresponding to the at least one graphics asset into the asset server to produce the texture.

11. The communication device of claim 10, wherein the process is started up when the communication device is initialized.

12. The communication device of claim 10, wherein the process is started up when an operating system that executes on the one or more processors is initialized.

13. The communication device of claim 8, wherein the at least one graphics asset includes a bitmap of a digital image.

14. The communication device of claim 8, wherein:
   the executable instructions, when executed by the one or more processors, cause the one or more processors to share an additional graphics asset from the plurality of graphics assets with the two or more applications, and to share a texture corresponding to the additional graphics asset with the one or more GPUs; and
   the executable instructions, when executed by the one or more GPUs, cause the one or more GPUs to render based on the shared texture corresponding to the additional graphics asset, an instance of the additional graphics asset for each of the two or more applications.

15. A method, comprising:
in a communication device including one or more GPUs and one or more processors,
   executing a first process and a second process on the one or more processors, wherein the first process maintains a plurality of graphics assets and the second process maintains a plurality of textures corresponding to the plurality of graphics assets;
   sharing from the first process, at least one graphics asset from the plurality of graphics assets with two or more applications, the two or more applications being different from the first process and the second process;
   sharing from the second process, at least one texture from the plurality of textures, corresponding to the at least one graphics asset with the one or more GPUs;
   sharing from the two or more applications, the at least one graphics asset with the one or more GPUs; and
   rendering using the one or more GPUs, an instance of the at least one graphics asset for each of the two or more applications, the rendering being based on the shared at least one texture and the shared at least one graphics asset.

16. The method of claim 15, wherein the first process includes the second process.

* * * * *